Patented Mar. 13, 1951 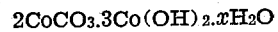 2,545,424

UNITED STATES PATENT OFFICE 2,545,424

LITHIUM COBALTITE

Reuben B. Ellestad and Bernard R. Babbitt, Minneapolis, Minn., assignors to Metalloy Corporation, Minneapolis, Minn., a corporation of Minnesota No Drawing. Application December 2, 1946, Serial No. 713,464

1 Claim. (Cl. 23—51)

Our invention relates to the production of new and highly useful lithium-cobalt oxide compounds in which the cobalt is present in the acid radical of the compounds and in which, in its particularly preferred form, the cobalt has a valence of three, exemplified by the compound $LiCoO_2$ which we denote by the name lithium cobaltite. The compounds have utility for a variety of purposes in the ceramic industry, as a constituent of porcelain enamel type coatings for iron and steel, etc.

The compounds may be prepared by heating, at elevated reaction temperatures in an oxidizing atmosphere for a time sufficient to enable the reaction to be completed, an oxygen-containing lithium compound, notably lithium carbonate, lithium nitrate, lithium oxide or lithium hydroxide, with a cobalt oxide or hydroxide or a cobalt salt which at the elevated reaction temperatures involved, undergoes thermal decomposition to produce an oxide of cobalt. Typical of such cobalt salts is cobalt carbonate ($CoCO_3$), and cobalt nitrate ($Co(NO_3)_2.6H_2O$). It is preferred that the reaction be carried out by the use of indirect heat, that is, in such a manner that the reacting substances are not in direct contact with the products of combustion of the flame used for heating. In this way, the possible retarding effect of the products of combustion on the reaction is eliminated. The oxidizing atmosphere may be maintained in the furnace or like equipment, during the reaction, by means of pure oxygen but this is unnecessary as excellent results are obtained by using air as the oxidizing atmosphere.

The lithium carbonate and the cobalt oxide (or cobalt salt which undergoes thermal decomposition to cobalt oxide) are used in such admixture that the atomic ratio of lithium to cobalt is approximately 1 to 1. Thus, where lithium carbonate, for example, is reacted with $Co_2O_3$, said ingredients react in equi-molal proportions to produce the lithium cobaltite. Where $Co_3O_4$ is employed in the reaction with the lithium carbonate, the ratio of the reactants is preferably 2 mols of $Co_3O_4$ to 3 mols of the lithium carbonate. Where CoO is reacted with lithium carbonate, the ratio of said reactants is preferably 2 mols of the CoO to 1 mol of the lithium carbonate. Where $CoCO_3$ is reacted with the lithium carbonate, the ratio of said reactants is preferably 2 mols of $CoCO_3$ to 1 mol of the lithium carbonate. It may be noted, in this general connection, that commercial cobaltous carbonate is usually a rather indefinite basic carbonate commonly represented as $$2CoCO_3.3Co(OH)_2.xH_2O$$

When using such a compound, the cobalt content thereof should be ascertained in order that it may be admixed in proper amounts with the lithium carbonate so that, as pointed out above, the atomic ratio of the lithium to the cobalt is approximately 1 to 1. Similar considerations hold where the source of the cobalt comprises indefinite hydrates of cobalt oxides, such as $CoO.xH_2O$. While an excess of either of the two reactants may be utilized in the reaction, it serves, in the main, to contaminate the lithium cobaltite which is produced in the reaction. In general, therefore, we prefer to employ proportions of reactants in approximately the molal ratios in which they will react to produce the lithium cobaltite ($LiCoO_2$).

The reaction between the lithium and cobalt compounds to produce the lithium-cobalt oxide compounds takes place, as previously pointed out, at elevated temperatures, and, when lithium carbonate is used, the reaction is accompanied with the evolution of carbon dioxide. In general, in order to obtain substantially complete reaction between the reactants, we prefer, in most cases, to carry out the heating at about 900 degrees C. to about 950 degrees C. for about 1 to 3 hours or more. At substantially higher temperatures, for example, 1100 degrees C., some oxygen is driven off and it is preferred, therefore, that a temperature of about 1000 degrees C. be not exceeded and, still more desirably, that a temperature of about 950 degrees C. be not exceeded. It will be understood that time and temperature are reciprocal factors.

The following examples are illustrative of the practice of the invention. It will be appreciated that other lithium and cobalt compounds may be utilized, the proportions of reactants and temperatures may be varied somewhat and other modifications resorted to which will be evident to those skilled in the art in the light of the guiding principles disclosed herein.

Example 1

An intimate mixture was made of 2500 grams of technical cobalt oxide ($Co_3O_4$) and 1150 grams of $Li_2CO_3$. The mixture was placed in a small stainless steel rotating kiln, with openings at both ends, and fired on the outside with a gas flame. During the firing, a current of air was passed through the kiln. The firing operation was carried out for a total of 2½ hours, and, during the last hour, the temperature of the material was at 900 degrees C. to 1000 degrees C. The final reaction product comprised a soft sinter, low in carbonate, and showed no evidence of fusion. It was easily removed from the kiln and ground. The yield was about 6½ pounds, which is about 97%. Analysis of the product showed 8.11% of available oxygen (as compared with the theoretical percent of 8.17 for pure $LiCoO_2$).

*Example 2*

Equi-molal proportions of lithium carbonate and $Co_2O_3$ were reacted, as described in Example 1. The resulting product, on analysis, was shown to correspond to the formula $LiCoO_2$.

*Example 3*

A mixture of CoO and technical lithium carbonate, in the proportion of 2 mols of CoO to 1 mol of technical lithium carbonate, was heated by indirect fire at 900–950 degrees C. for 2 hours while passing a stream of heated air in contact with the reaction mixture. The reaction product obtained comprised lithium cobaltite, $LiCoO_2$.

As we have indicated above, if temperatures of the order of 1100 degrees C. are utilized in the reaction, some oxygen is driven off from the lithium cobaltite. In this connection, it may be pointed out that the "available oxygen" content of pure $LiCoO_2$ is 8.17%. The "available oxygen" content is calculated in the following manner:

When $LiCoO_2$ functions as an oxidizing agent, the valence of the cobalt changes from 3 to 2 and, in so doing, one atom of oxygen is released from 2 molecules of $LiCoO_2$ in accordance with the following equation:

$$2LiCoO_2 \rightarrow Li_2O + 2CoO + O$$

Since, pursuant to said equation, 195.8 grams of $LiCoO_2$ yields 16 grams of oxygen, the "available oxygen" content of $LiCoO_2$ is $$\frac{16}{195.8} \times 100 = 8.17\%$$

In ordinary commercial operations, when operating in the range of about 900–950 degrees C., the "available oxygen" content of the reaction product obtained is generally very close to the theoretical value of 8.17% for $LiCoO_2$, being, in the usual case, about 7.9 to about 8.1%. Depending upon the particular temperature and the length of time of heating, the "available oxygen" content of the lithium-cobalt oxide products will vary from about 4.5% to the theoretical. We particularly prefer those products in which the "available oxygen" content ranges from about 7.5% to 8.17%, but those products containing as low as about 4.5% "available oxygen" are not excluded from the scope of our invention since they have utility for various purposes such as those mentioned above.

It will be understood that it is unnecessary to use pure or substantially pure sources of the lithium and cobalt compounds. Technical grades may be employed as well as natural ores containing substantial proportions of the lithium and cobalt reactants if technical lithium cobaltite is desired to be produced. Where, however, pure or substantially pure lithium cobaltite is desired, correspondingly pure reactants should be utilized.

In carrying out the reaction, the lithium and cobalt compounds to be reacted should be well mixed and, during the heating operation, it is desirable to rabble the mixture periodically to insure oxidation, even heat penetration, and consequent complete reaction.

While the invention has been described in detail, it is to be understood that the scope thereof is not to be limited other than is set forth in the claim.

What we claim as new and desire to protect by Letters Patent of the United States is:

A lithium cobaltite product, the lithium cobaltite in the pure state corresponding to the formula $LiCoO_2$, said product decomposing to give $Li_2O$, CoO, and $O_2$ according to the equation $$4LiCoO_2 \rightarrow 2Li_2O + 4CoO + O_2$$

the $O_2$ yield of said product varying from 55% to 100% of the theoretical.

REUBEN B. ELLESTAD.
BERNARD R. BABBITT.

REFERENCES CITED

The following references are of record in the file of this patent:

Mellor: "Comprehensive Treatise on Inorganic and Theoretical Chemistry," vol. 14, 1935, pp. 593, 594, vol. 2, 1922, p. 486.

Mixter: "American Journal of Science," vol. 30, series 4, pp. 196, 197 (1910).